United States Patent [19]
Modersohn

[11] 4,213,521
[45] Jul. 22, 1980

[54] CLUTCH-BRAKE ASSEMBLY FOR ROTARY IMPLEMENTS

[75] Inventor: Charles W. Modersohn, Beloit, Wis.

[73] Assignee: Warner Electric Brake & Clutch Company, South Beloit, Ill.

[21] Appl. No.: 753,417

[22] Filed: Dec. 22, 1976

Related U.S. Application Data

[63] Continuation-in-part of Ser. No. 655,753, Feb. 6, 1976, abandoned.

[51] Int. Cl.² .................... F16D 67/02; A01D 69/08
[52] U.S. Cl. .................... 192/18 R; 192/35; 192/54; 192/93 A; 192/89 A; 56/11.3
[58] Field of Search .................... 192/54, 14, 16, 12 R, 192/18 R, 93 A, 89 A, 18 A, 24, 35, 36; 56/11.3, 11.7, 11.8

[56] References Cited

U.S. PATENT DOCUMENTS

| 1,330,193 | 2/1920 | Krause | 192/36 |
| 2,446,138 | 7/1948 | Lambert | 192/93 A |
| 2,662,624 | 12/1953 | Giffen | 192/54 X |
| 2,695,693 | 11/1954 | Cartlidge | 192/54 |
| 2,711,237 | 6/1955 | Wylie | 192/54 X |
| 2,771,977 | 11/1956 | Uher | 192/93 A |
| 2,825,434 | 3/1958 | Smitzer | 192/18 R |
| 2,985,992 | 5/1961 | Dowdle | 192/18 R X |
| 3,084,777 | 4/1963 | McCallum et al. | 192/18 R X |
| 3,194,367 | 7/1965 | Winter | 192/54 X |
| 3,420,343 | 1/1969 | Stieple | 192/18 R |
| 3,490,569 | 1/1970 | Reed | 192/54 X |
| 3,839,795 | 10/1974 | Dooley | 192/93 A X |
| 3,991,864 | 11/1976 | Muller et al. | 192/105 BA |
| 4,141,439 | 2/1979 | Lunde et al. | 192/18 R |

FOREIGN PATENT DOCUMENTS 986444 3/1965 United Kingdom ................ 192/93 A

Primary Examiner—George H. Krizmanich
Attorney, Agent, or Firm—Leydig, Voit, Osann, Mayer & Holt, Ltd.

[57] ABSTRACT

The blades of a rotary lawn mower are driven by a constantly rotating shaft through a clutch-brake assembly which, when the operator leaves the operating station of the mower such as the mower handles, automatically disengages the blades from the shaft and brakes the blades while permitting the shaft to continue to rotate. The clutch-brake assembly is self-energizing and normally is engaged but is held in the disengaged condition by an actuator which also is self-energized and which initially is energized by a spring. The latter is effective to disengage the clutch and actuate the brake thereby to prevent the blades from rotating until the operator moves a manual member at the operating station to overcome the spring which initially energizes the actuator. This de-energizes the actuator so that the brake is disengaged and the clutch is engaged whereby the shaft rotates the blades.

14 Claims, 16 Drawing Figures

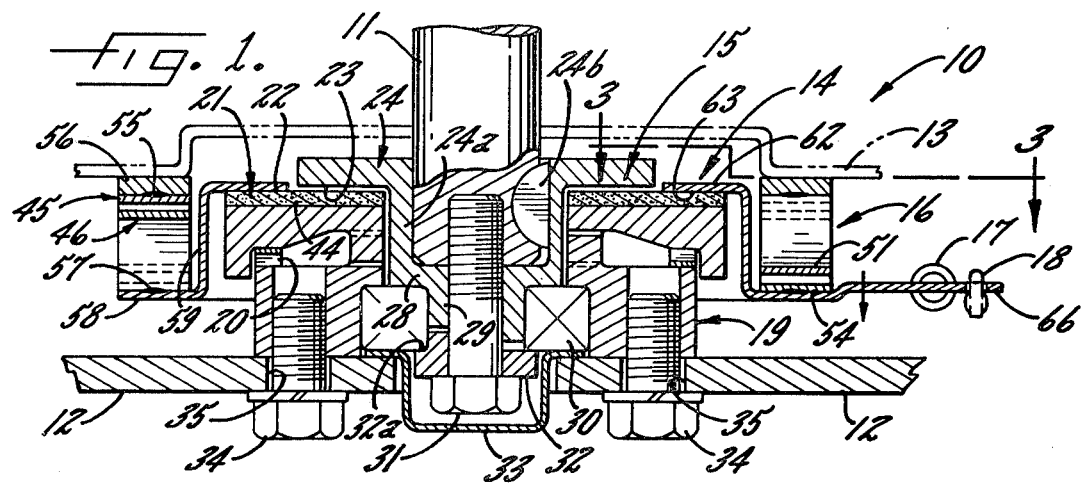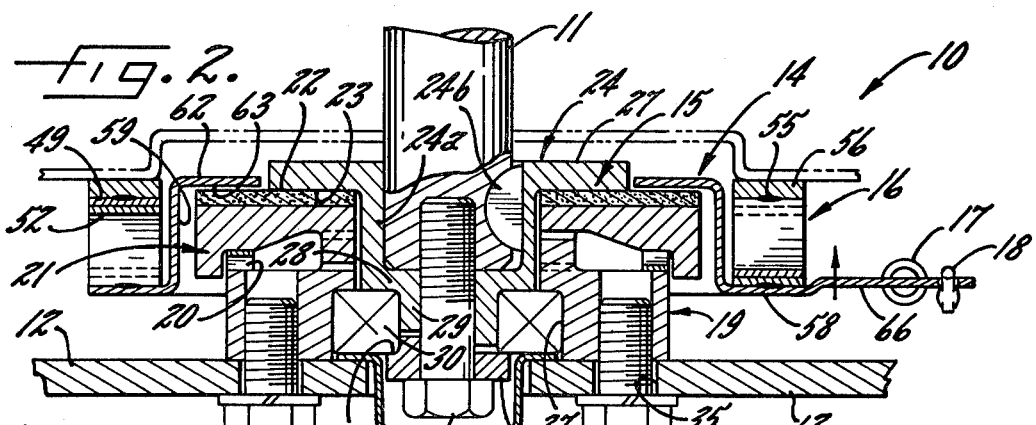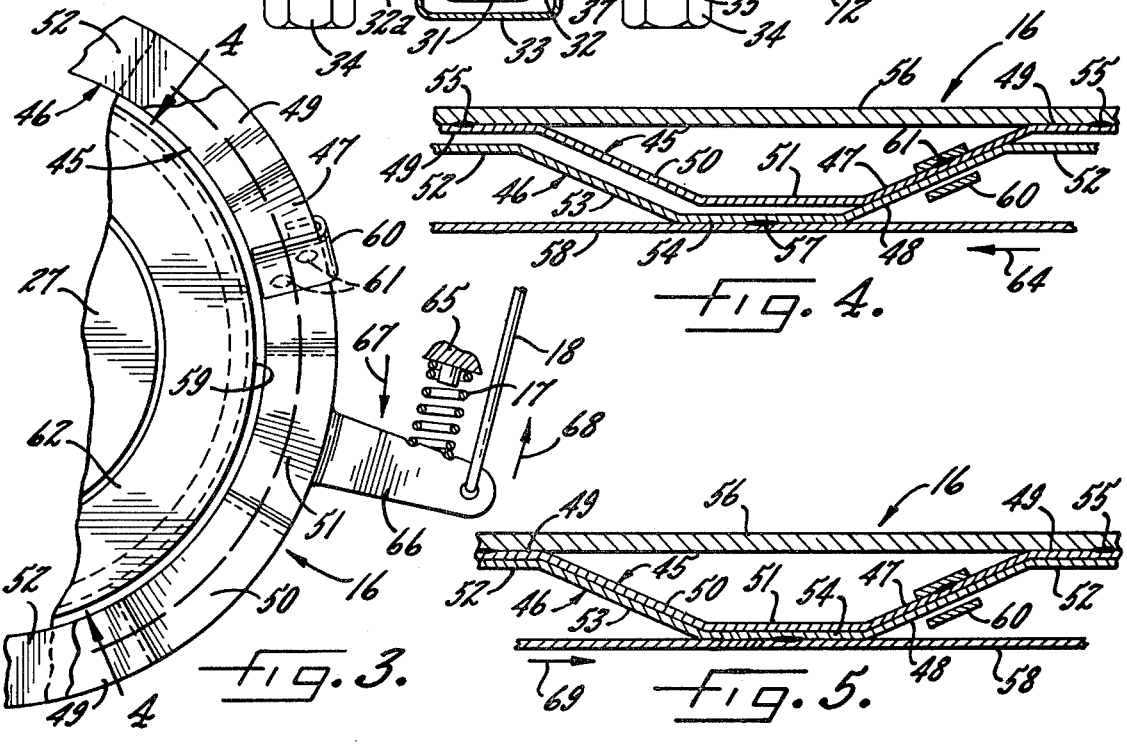

CLUTCH-BRAKE ASSEMBLY FOR ROTARY IMPLEMENTS

CROSS-REFERENCE TO RELATED APPLICATION

This application is a continuation-in-part of my copending application Ser. No. 655,753, filed Feb. 6, 1976, and now abandoned.

BACKGROUND OF THE INVENTION

Rotary implements such as rotary lawn mowers normally are driven by a motor or an engine which drives a shaft coupled to the blades. In usual prior constructions, the shaft has driven the blades directly with the result that, when the operator leaves the operating station such as the mower handles, the blades continue to rotate and this creates a potentially hazardous condition.

SUMMARY OF THE INVENTION

The general object of the invention is to provide a novel clutch assembly which may be interposed between the drive shaft and the rotary implement, which automatically disconnects the implement from the drive shaft when the operator leaves the operating station and which is comparatively easy to use and inexpensive to manufacture.

A further object is to incorporate a brake in the assembly whereby the brake automatically stops the rotation of the implement when the clutch disconnects the latter from the drive shaft.

A more detailed object is to utilize a self-energizing clutch which is normally disengaged but is engaged by a relatively low force exerted by the operator at the operating station.

Still a further object is to incorporate a self-energizing actuator which normally is urged by a resilient means in the energizing direction to disengage the clutch and which is deenergized by the manual means, which overcomes the resilient means, to initiate the self-energizing of the clutch thereby to couple the drive shaft and the rotary implement by the application of a comparatively light force of the operator at the operating station.

It also is an object of the invention to arrange the actuator so that, when the actuator is self-energized by the resilient means, the actuator not only disengages the clutch but also causes the brake to stop rotation of the rotary implement until the operator actuates the manual means.

The invention also resides in the particular constructions of the clutch, the actuator, the brake and the coaction of these elements.

BRIEF DESCRIPTION OF THE DRAWINGS

FIG. 1 is a fragmentary vertical sectional view of a clutch-brake assembly embodying my invention and showing the parts in the position in which the implement is stopped.

FIG. 2 is a view similar to FIG. 1 but showing the parts in the position in which the implement rotates.

FIG. 3 is a fragmentary sectional view taken along the line 3—3 in FIG. 1.

FIG. 4 is a fragmentary sectional view taken along the line 4—4 in FIG. 3 and showing the parts of the actuator in one position.

FIG. 5 is a view similar to FIG. 4 but showing the parts of the actuator in a different position.

DETAILED DESCRIPTION OF THE PREFERRED EMBODIMENTS

Figure 6:
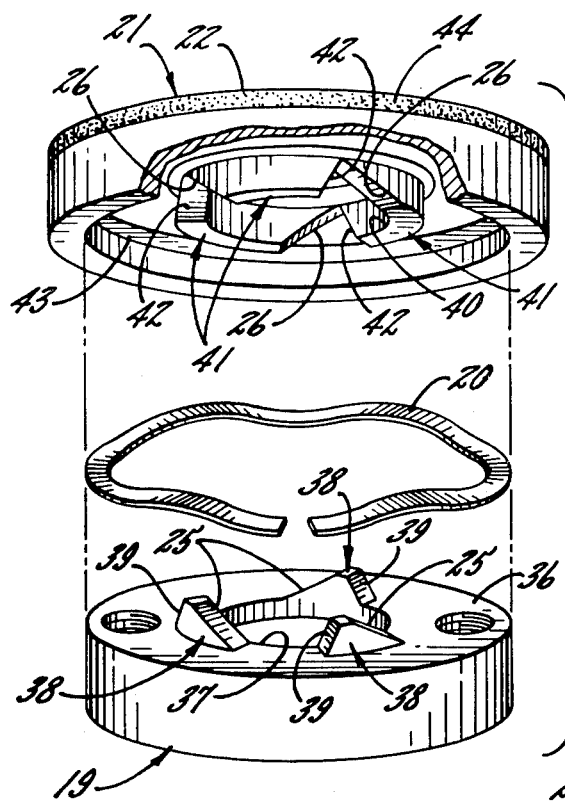
FIG. 6 is an exploded perspective view of the cam members used in the clutch.

As shown in the drawings for purposes of illustration, the present invention is embodied in a clutch-brake assembly 10 adapted selectively to couple or disengage a normally rotating shaft 11 and a rotary implement such as the blades 12, which may be formed as a unitary piece, of a rotary lawn mower. The shaft is driven by a motor or engine (not shown) and, in a manner to be described, the assembly is supported on the frame of the mower, a portion 13 of the frame being shown in the drawings. When the clutch portion of the assembly 10 is engaged, the shaft 11 drives the blades 12 and, when the clutch portion is disengaged, the brake portion 14 of the assembly becomes operative to stop rotation of the blades while the shaft 11 continues to rotate.

For purposes of both convenience and safety, it is desirable that, when the operator of the mower leaves the operating station of the lawn mower such as the handles (not shown) of the mower, the motor or engine of the mower continues to rotate the shaft 11 but the shaft automatically is disengaged from the blades 12 and, preferably, also that the latter are braked quickly to a stop. Accordingly, the present invention contemplates an assembly incorporating a normally-engaged, self-energizing clutch 15 to couple the shaft 11 and the implement 12 and a self-energizing actuator 16 which is normally energized by a resilient means 17 to hold the clutch in the disengaged condition. Means 18 manually operable from the operating station overcomes the resilient means to deenergize the actuator 16 and permit the clutch 15 to energize and couple the shaft 11 and the implement 12. As another significant aspect, the invention also contemplates a brake portion 14 being incorporated in the assembly 10 and arranged to stop the implement when the resilient means 17 energizes the actuator 16 to disengage the clutch 15 and with the brake portion being automatically disengaged as an incident to the manual engagement of the clutch. As used herein, the term "self-energization" has the same meaning as commonly understood in the clutch and brake art, that is, with a load applied to one of the two elements of the clutch or brake, an actuating force, usually comparatively small, is applied to initiate coupling of the two elements. Thereafter, the frictional force of the clutch or brake augments the actuating force whereby a lesser actuating force is required for a given clutch or brake torque.

Figure 7:
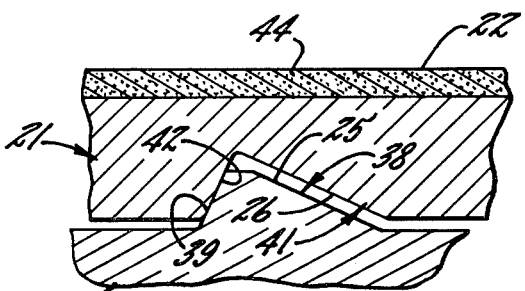
FIG. 7 is an enlarged fragmentary sectional view of portions of the cam members.
Figure 8:
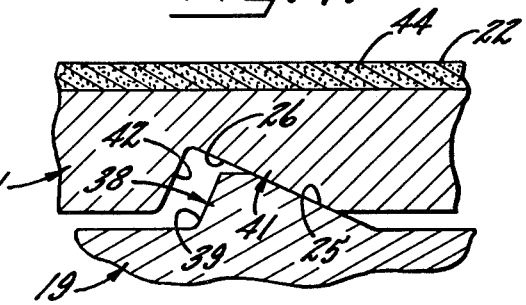
FIG. 8 is a view similar to FIG. 7 but showing the cam members in a moved position.

In the present instance, the blades 12, which herein constitute the rotary implement, are secured to a lower cam member 19 which is engaged by a resilient member 20 and the latter urges an upper cam member 21 upwardly to bring a friction surface 22 on the upper cam member into engagement with an opposing surface 23 on a member 24 fixed to the shaft 11, the member 24 and the upper cam member 21 constituting the principal elements of the clutch 15. The lower and upper cam members 19 and 21 include one or more pairs, herein three, of opposed inclined cam surfaces or ramps 25 and 26 (FIGS. 7 and 8) formed respectively on the cam members 19 and 21 and engage each other (FIG. 7 shows the surfaces separated for clarity of illustration). As the upper cam member 21 is begun to be turned by the member 24, the cam surface 26 rides up the cam surface 25 and thus the cam surfaces produce the self-energizing effect of moving the cam members apart and the clutch surfaces 22 and 23 into engagement to couple the shaft 11 and the blades 12 with a force which progressively increases beyond the force of the resilient element 20.

Preferably, the clutch member 24 is annular and coaxial with the shaft 11 with an intermediate cylindrical portion 24a encircling the shaft and fixed to the latter by a key 24b. An annular flange 27 integral with the upper end of the cylindrical portion 24a provides on its under side the friction surface 23 which opposes the surface 21 and is one of the engaging surfaces of the clutch 15. At the lower end of the cylindrical portion 24a, the clutch member 15 includes an annular section 28 projecting inwardly under the end of the shaft 11 and a downwardly projecting cylinder 29. The lower cam member 19 is journaled on the cylinder 19 by a bearing 30 which is held in place by a bolt 31 which projects through a collar 32 and the cylinder 29 and is threaded into the lower end of the shaft 11, the bearing 30 thereby being clamped between an annular shoulder 32a on the collar 32 and the section 28. A flanged cap 33 covers the bolt 31 and the collar 32 and, as will appear later, is clamped against the lower end of the bearing 30 to protect the bearing and other moving parts of the entire assembly from dirt and the like.

The lower cam member 19 is an annulus concentric with the shaft 11 and, as stated above, is journaled on the bearing 30 for selective rotation relative to the shaft. The blades 12 are fastened to the underside of the lower cam member by bolts 34 projecting through holes 35 in the blades and threaded into the lower cam member so that the blades rotate with the lower cam member and, at the same time, hold the cap 33 in place. With particular reference to FIG. 6, the lower cam member is formed with an upwardly facing annular surface 36 surrounding the bore 37 which encircles the bearing 30 and three teeth 38 project upwardly from the annular surface 36 around the bore 37. Each of the teeth 38 provides one of the cam surfaces 25 which is inclined upwardly, preferably at an angle on the order of 24 degrees. The other surface 39 of each tooth extends downwardly at an angle approaching perpendicular to the surface 36.

Above and slightly spaced axially from the lower cam member 19 is the upper cam member 21 which also is formed with a central bore 40 encircling the cylindrical portion 24a of the clutch element 24 and a surface 43 facing downwardly to oppose the surface 36 of the lower cam member. Equally spaced around the bore 40 are three teeth 41 which have inclined cam surfaces 26 mating with the surfaces 25 on the teeth 38 (see also FIGS. 7 and 8) and sharply downwardly extending surfaces 42 opposing the surfaces 39 on the teeth 38. Disposed between the cam members 19 and 21 is an annular wave spring which constitutes the resilient means 20 and acts between opposed annular surfaces 36 and 43 on the margins of the cam members to urge the upper cam member, which is slidable on the cylindrical portion 24a of the clutch element 24, upwardly and bring the friction surface 22 on the upper cam member into engagement with the friction surface 23 on the clutch element 24. This couples the shaft 11 to the blades 12 through the clutch element 24 and the cam members 19 and 21. The ramp or cam action of the inclined surfaces 25 and 26 produces a self-energizing effect which tends to increase the force between the friction surfaces 22 and 23 and correspondingly increase the coupling action between the shaft and the blades. Preferably, the friction surface 22 on the upper side of the upper cam member 21 is formed by an annulus 44 of friction material bonded to the upper cam member.

Figure 9:
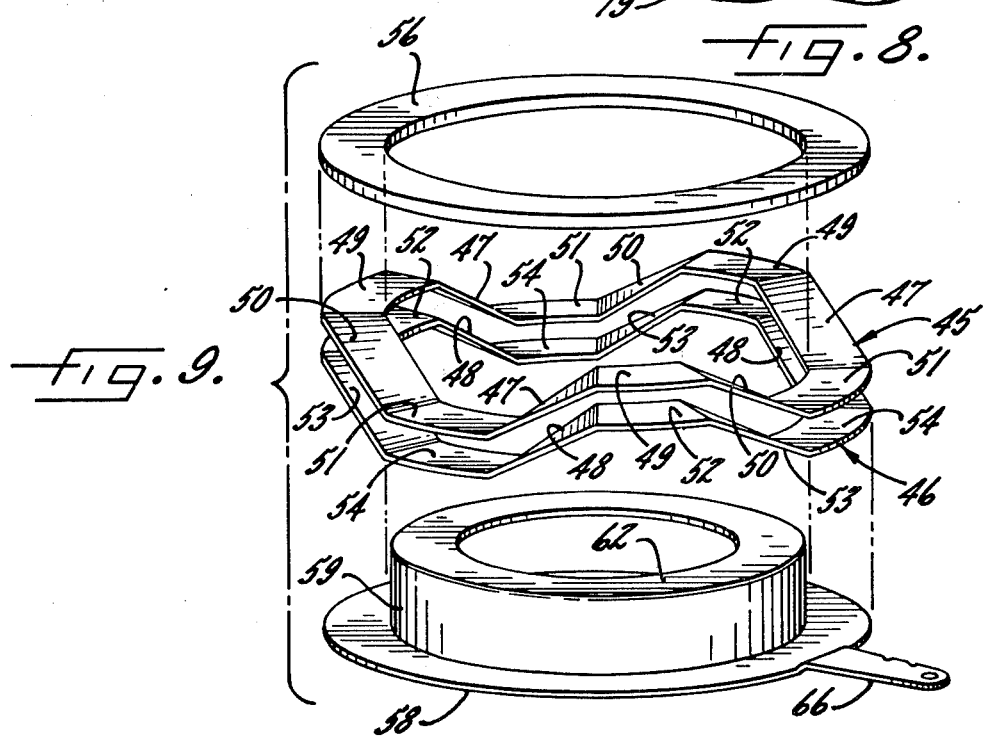
FIG. 9 is an exploded perspective view of the actuator.

In its preferred form, the actuator 16 is self-energizing in the same general manner as the clutch 15. Thus, the actuator includes two sheet metal rings 45 and 46 concentric with the shaft 11 and formed with one or more pairs, herein three, of opposed inclined surfaces or ramps 47 and 48. The resilient means 17 urges the rings relative to each other so that ramps 47 on the upper ring 45 tend to ride up relatively on the ramps 48 on the lower ring 46. This action produces a progressively increasing force greatly exceeding the force of the resilient means 17. As seen most clearly in FIG. 9, the upper ring 45 also includes high flats 49 at the upper end of each ramp 47, downwardly inclined portions 50 following each high flat and low flats 51 connecting the portions 50 and the next one of the ramps 47. The lower ring 46 is identical in shape to the upper ring 45 and includes high flats 52, downwardly inclined portions 53 and low flats 54, all generally opposing the corresponding portions of the upper ring.

As indicated at 55 in FIGS. 4 and 5, the high flats 49 of the upper ring 45 of the actuator 16 are spot welded to a ring 56 which is fixed to the portion 13 of the frame of the lawn mower and encircles the shaft 11 (see also FIGS. 1 and 2), the upper ring thereby being stationary relative to the mower frame. The low flats 54 of the lower ring 46 are spot welded at 57 to a radially outwardly projecting flange 58 on the lower end of a sheet metal cylinder 59 surrounding the upper cam member 21 (see FIGS. 1 and 2). The cylinder 59, and hence the lower ring 46, is permitted to turn relative to upper ring 45 as limited by U-shaped clips 60 (FIGS. 4 and 5) loosely surrounding the ramps 47 and 48 and spot welded at 61 to the ramp 47. An inwardly projecting flange 62 on the upper end of cylinder 59 extends over the outer margin of the friction surface 22 on the upper cam member 21. When the actuator 16 is energized, the flange 62 pressed on the friction surface 22 and forces the upper cam member 21 down against the action of the wave spring 20 to move the friction surface 22 away from the opposing surface 23 on the clutch element 24 to disengage the clutch 15. At the same time, the under surface 63 of the flange frictionally engages the friction surface 22 to retard the rotation of the upper cam member 21 and, through the coaction of the surfaces 39 and 42 on the cam members 19 and 21, stops the rotation of the blades 12, the flanges 62 and the surface 22 constituting the brake 14.

Herein, the lower ring 46 of the actuator 16 is urged in the energizing direction (to the left in FIG. 4 as indicated by the arrow 64) by the resilient means 17 which may, as shown in FIG. 3, be a compression spring acting between a portion 65 of the lawn mower frame and a finger 66 projecting laterally from the lower flange 58 on the cylinder 59 to urge the finger in the direction of the arrow 67. In this manner, the spring 17 normally urges the ramp 48 on the lower ring 46 down on the ramp 47 on the upper ring 45 as illustrated in FIG. 4 and causes the flange 62 on the cylinder 58 to press down on the friction surface 22 of the upper cam member 21 thereby to disengage the clutch 15 and prevent rotation of the blades 12. In order to disengage the brake 14 and engage the clutch 15 so that the shaft 11 drives the blades 12, the manual member 18 is a cable anchored at one end to the finger 66 and extending to the operating station of the mower such as at the handles of the mower. When the operator of the mower is at the operating station, he holds a suitable part such as a lever (not shown) which pulls the cable 18 in a direction to turn the lower ring 46 counterclockwise as viewed in FIG. 3 (see arrow 68 in FIG. 3 and arrow 69 in FIG. 5) against the action of the spring 17 thereby to move the ramp 48 on the lower ring 46 of the actuator up on the ramp 47 of the upper ring 45 to the position shown in FIG. 5 and this releases the brake 14, engages the clutch 15 and the shaft 11 thereby rotates the blades 12. Because of the self-energizing action of the actuator 16, the spring 17 need only exert a comparatively light force to energize the actuator and, thus, only a similarly light force need be applied to the cable 18 to deenergize the actuator.

With the foregoing arrangement, the operation may best be understood with the assembly starting in a condition in which the lawn mower engine is running to drive the shaft 11 but the actuator 16 is energized as shown in FIGS. 1 and 4 so that the flange 62 presses down on the friction surface 22 on the upper side of the upper cam member 21 to disengage this surface from the friction surface 23 of the clutch element 24. In this condition, the surface 63 of the flange 62 and the friction surface 22 of the upper cam member 21, these surfaces constituting the brake 14, hold the upper cam member against rotation and the sharply inclined surfaces 39 and 42 on the teeth 38 and 41 of the cam members 45 and 46 are in engagement as shown in FIG. 7 to prevent the lower cam member 17 and hence the blades 12 from rotating. When the operator desires to use the mower, he goes to the operating station of the mower and moves, with light force, a lever or the like (not shown) to pull the cable 18 in the direction indicated by the arrow 68 in FIG. 3 to turn the lower ring 46 of the actuator counterclockwise against the action of the spring 17. As a result, the lower ring 46 of the actuator 16 turns to the right (see arrow 69 in FIG. 5) so that the ramps 47 on the ring 45 no longer tend to climb relative to the ramps 48 on the ring 46 and the rings of the actuator 16 assume generally the positions illustrated in FIG. 5. The flange 62 on the cylinder 59 thereby moves up as shown in FIG. 2 and permits the wave spring 20 to urge the upper cam member 21 upwardly so that the friction surfaces 22 and 23 engage and the upper cam member begins to turn with the shaft 11. The ramps 26 on the teeth 41 of the upper cam member thus ride up on the ramps 25 on the teeth 38 of the lower cam member 19 (see FIG. 8) and this produces a progressively increasing force or self-energizing effect which forces the upper cam member 21 upwardly to engage fully the friction surface 22 of the upper cam member with the friction surface 23 of the clutch element 24. This results in a progressively self-energizing of the clutch 15 which couples the shaft 11 and the lower cam member 19 and rotates the blades 12.

When the operator leaves the operating station of the lawn mower, the cable 18 is released automatically and the spring 17 becomes effective to turn the lower ring 46 of the actuator 16 clockwise as indicated by the arrow 67 in FIG. 3 and the arrow 64 in FIG. 4. As a result, the ramp 48 on the lower actuator ring 46 rides down on the ramp 47 on the upper ring 45 (see FIG. 4) and this produces a self-energizing effect of the actuator 16 to force the lower ring 46 downwardly so that the flange 62 on the cylinder 59 presses down on the friction surface 22 of the upper cam member 21 and, as shown in FIG. 1, the flange 62 forces the upper cam member 21 down against the action of the wave spring 20 and disengages the friction surface 22 and 23 of the clutch 15. At the same time, the lower surface 63 of the flange 62 frictionally engages the margin of the surface 22 to retard the upper cam member 21. This causes the surfaces 39 and 42 on the teeth 38 and 41 of the cam members 19 and 21 to engage and stop rotation of the lower cam member 19 and thus the rotation of the blades 12.

Figure 10:
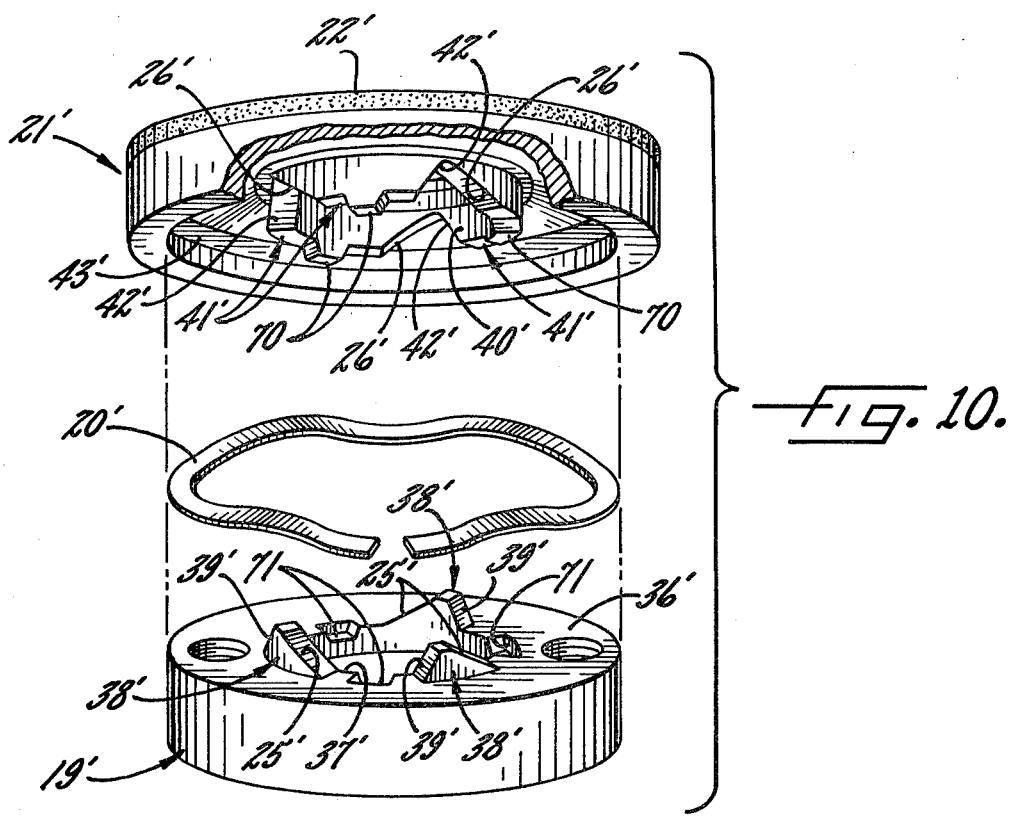
FIG. 10 is an exploded perspective view, similar to FIG. 6, of a modification of the cam members used in the clutch.
Figure 11:
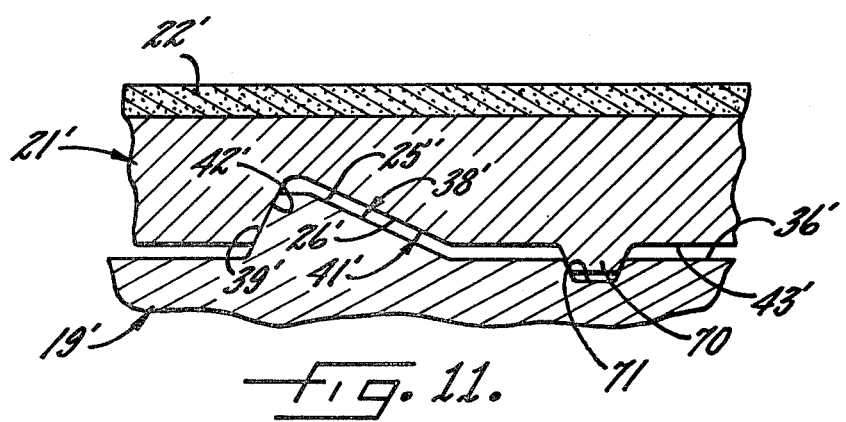
FIG. 11 is an enlarged fragmentary sectional view of portions of the modified cam members.
Figure 12:
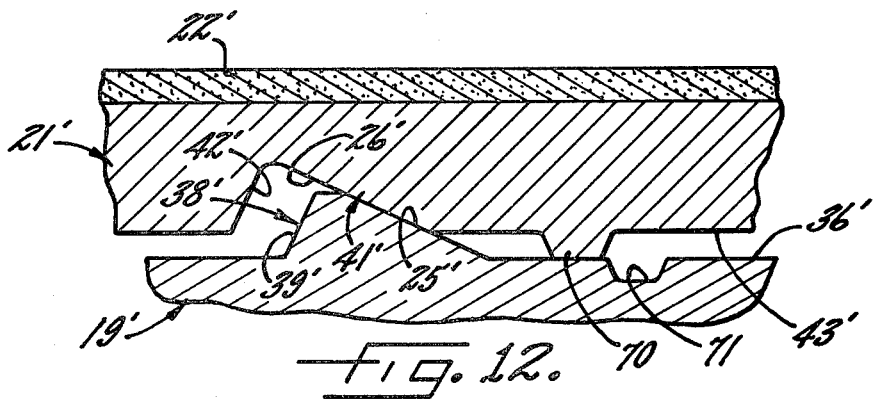
FIG. 12 is a view similar to FIG. 11 but showing the cam members in a moved position.
Figure 13:
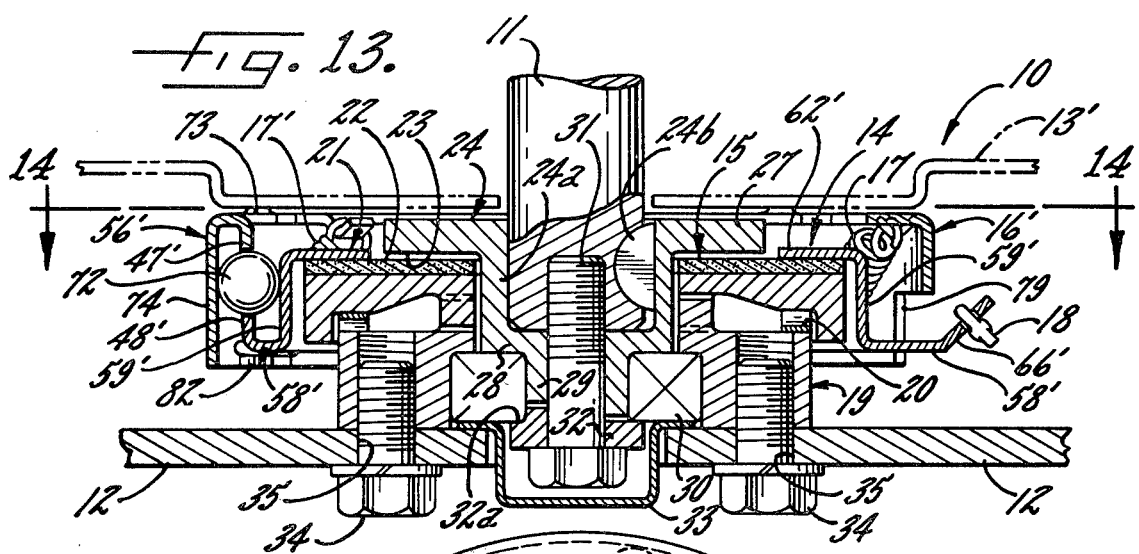
FIG. 13 is a fragmentary sectional view, similar to FIG. 1, showing a modified form of actuator.
Figure 14:
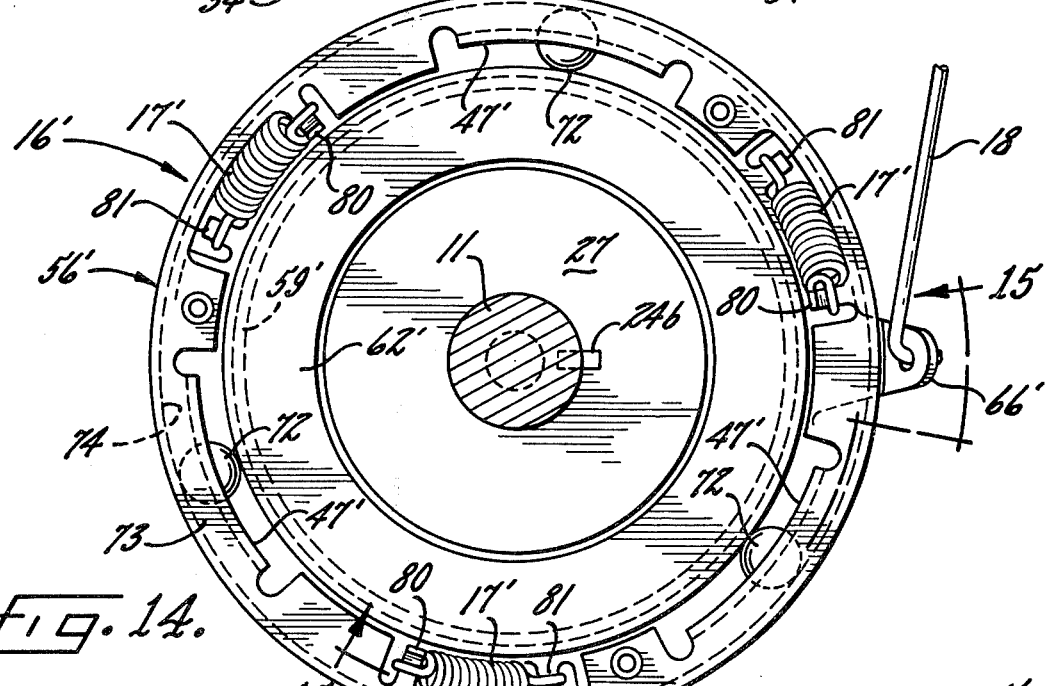
FIG. 14 is a sectional view taken along the line 14—14 in FIG. 13.

FIGS. 10, 11 and 12 illustrate a modified form of the cam members 19' and 21', similar parts being indicated by the same but primed reference characters. This form includes the provision of means for preventing the accidental application of an initiating force to the clutch 15 when the latter is disengaged so that the clutch can only be engaged by the manually operable element 18. Thus, this means prevents either one of the cam members being turned by hand relative to the other one which would, if permitted, initiate the self-energization of the clutch by virtue of the surface 26' beginning to ride up the surface 25'.

Herein, this means comprises at least one abutment 70 on one of the cam members 19' and 21' and at least one recess 71 formed in the other cam member with the abutment and the recess being positioned so that the abutment is received in the recess when the generally axial surfaces 39' and 42' of the teeth 38' and 41' are in engagement, that is, when the elements of the clutch and brake assembly are in the stop condition. In the form shown in the drawings, there are three abutments 70 in the form of lugs depending from the flat surface 43' on the underside of the upper cam member 21' and are spaced equidistantly around the bore 40'. Each lug is disposed between two adjacent teeth 41' and are generally rectangular in cross section, being tapered downwardly slightly as shown best in FIGS. 11 and 12. The inner side of the lug is flush with the wall of the bore 40' and the width of the lug is approximately the same as the width of the inclined surfaces 26'. Similarly, three recesses 71 in the form of radial slots are formed in the surface 36' of the lower cam member 19' and are disposed between the teeth 38' at positions corresponding to the positions of the lugs 70. The grooves 71 extend radially inwardly from the bore 37' of the cam member 19' and their shape is generally complemental to that of the lugs although the grooves preferably are slightly wider than the lugs to insure that the lugs seat in the grooves when the surfaces 39' and 42' engage each other.

With the foregoing arrangement, the lugs 70 are seated in the recesses 71 when the parts of the clutch and brake assembly are in the stop condition, that is, when the generally axial surfaces 39' and 42' of the cam members 19' and 21' are in engagement as shown in FIG. 11. In this condition, the lugs prevent the cam members from being inadvertently turned relative to each other such as might occur if there is an attempt to turn the blade 12 manually. Thus, the lugs 70 in cooperation with the recesses 71 prevent accidental self-energization of the clutch. When the cable 18 is pulled to permit energization of the actuator 16, however, the spring 20' moves the cam member 21' up thus lifting the lugs out of the recesses so that the inclined surface 26' may ride up the inclined surface 25' as shown in FIG. 12 and the self-energization of the clutch is initiated as described above.

In the event that it is desirable to reduce the friction of the actuator as results from the self-energization of the latter, a modified actuator 16' may be used as illustrated in FIGS. 13 through 16 in which similar parts are indicated by the same but primed reference characters. Such reduction of friction is achieved by interposing a ball 72 between the inclined self-energizing surfaces of the actuator so that one surface in effect rolls rather than sliding up the other surface.

Figure 15:
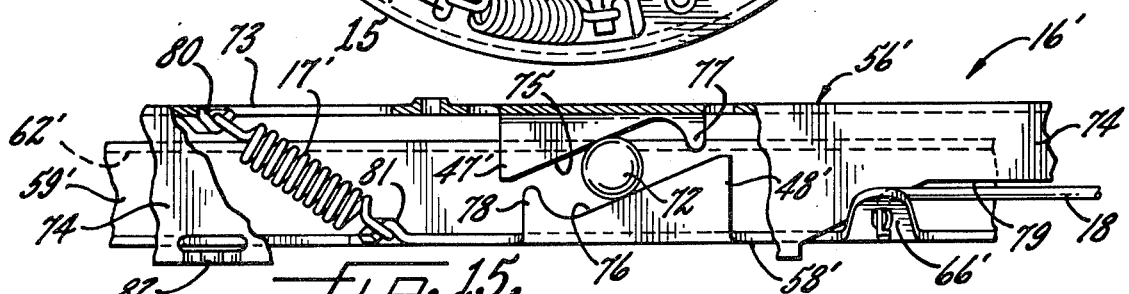
FIG. 15 is a fragmentary sectional view taken along the line 15—15 in FIG. 14.
Figure 16:
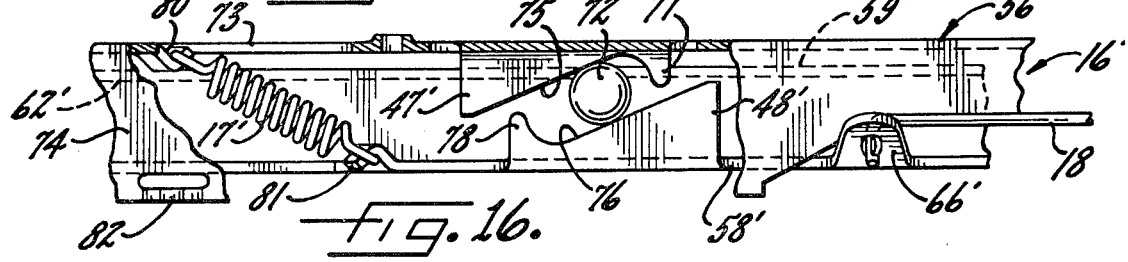
FIG. 16 is a view similar to FIG. 15 but showing the parts in a moved position.

In the form illustrated in the drawings, the actuator 16' includes a sheet metal upper ring 56' which is welded to the frame 13' and which is cup-shaped in that it comprises a flat annular portion 73 encircling the flange 27 and a cylindrical skirt 74 depending from the periphery of the annular portion. Struck downwardly from the annular portion are three flanges 47' which are spaced equidistantly around the ring 56' and which are disposed radially inwardly of the skirt 74. As shown in FIGS. 15 and 16, the bottom edges 75 of the flanges 47' are inclined and constitute one set of the self-energizing surfaces of the actuator.

A sheet metal cylinder 59' is disposed inside the flanges 47' and, as in the case of the form shown in FIG. 1, an annular flange 62' projects radially inwardly over the marginal portion of the friction surface 22. Projecting radially outwardly from the lower end of the cylinder is an annular flange 58' and struck upwardly from the latter are three short flanges 48' which are generally longitudinally alined with the flanges 47'. The upper edges 76 (FIGS. 15 and 16) of the flanges 48' are inclined at the same angle as the edges 75 and oppose the latter to constitute the other set of self-energizing surfaces of the actuator. Disposed between each pair of edges 75 and 76 is a ball 72 and the balls are contained radially by the skirt 74 and the cylinder 59' (See FIG. 13) and are contained circumferentially by projections 77 and 78 on the ends of the flanges 47' and 48' respectively (See FIGS. 15 and 16). An arm 66' projects outwardly from the flange 58' through a slot 79 in the skirt 74 and the cable 18 is connected to the outer end of this arm.

In the form of actuator shown in FIGS. 13 through 16, the yieldable means which exerts the force for initiating self-energization of actuator 16' is contained within the body of the actuator and also serves to hold the cylinder 59' and its associated parts in place relative to the ring 56'. Thus, this means comprises three contractile springs 17' each disposed between one pair of flanges 47', 48' and the adjacent pair of flanges and each having one end anchored to a tab 80 on the ring 56' and the other end anchored to a tab 81 on the flange 58'. The springs 17' are inclined in a direction to initiate self-energization, that is, to urge the cylinder 59' to turn clockwise as viewed in FIG. 14 (to the left in FIGS. 15 and 16).

The operation of the form shown in FIGS. 13 through 16 is basically the same as that shown in FIGS. 1 through 9. Thus, with no one at the operating station of the mower, the springs 17' initiate the self-energizing action of the actuator 16' by starting the cylinder 59' to turn so that the edges 76 of the flanges 48', through the medium of the balls 72, roll down on the edges 75 of the flanges 47'. This forces the cylinder and its associated parts axially downwardly whereby the flange 62' presses down on the friction surface 22 to disengage the clutch 15 and to brake the blade 12, the parts of the actuator then being in the position shown in FIG. 15. When the operator pulls the cable 18, the edge 76 of the flange 48' rolls up the edge 75 of the flange 47' as shown in FIG. 16 raising the flange 62' to disengage the brake 14 and engage the clutch 15 so that blade 12 turns. Small tabs 82 are bent in from the lower edge of the skirt 74 and underlie the flange 58'. These tabs merely help to hold the parts of the actuator 16' in place during assembly. Once assembled, however, the flange 58' always is spaced from the tabs 82 as the actuator is energized and deenergized.

With the clutch-brake assembly 10 described above, the assembly automatically disengages the shaft 11 from the blades 12 as soon as the operator leaves the operating station of the mower while permitting the engine of the mower to continue to run but holding the blades 12 against turning. The use of the self-energizing actuator 16 produces a strong and effective force to accomplish this. To operate the mower, the operator merely exerts a low force at the operator station to pull the cable 18 against the action of the spring 17 and this deenergizes the actuator 10, disengages the brake 14 and engages the clutch 15 with the result that the shaft 11 drives the blades 12. The end result is a clutch-brake system which safely disables the blades 12 when the operator leaves the operating station, which affords the operator a simple and low-force means for coupling the shaft 11 and the blades 12 when the operator is at the operating station and which is comparatively inexpensive.

I claim:

1. In an assembly for driving a rotary implement carried and driven by a power rotated shaft, the combination of, an annular friction element adapted to be fixed to said shaft to rotate therewith, a first annular cam member coaxial with and rotatable relative to said shaft, said cam member having a friction surface opposing said friction element and axially movable to bring the friction surface into engagement with the friction element whereby said cam member rotates with said shaft, a second cam member mounted to rotate relative to said shaft and adapted to carry a rotary implement, means holding said second cam member against axial movement relative to said shaft, opposed inclined cam surfaces formed on said first and second cam members and normally engaging each other when said first cam member is rotating whereby the two cam members rotate together, resilient means acting on said first cam member and urging the latter axially in a direction to engage said friction element, an actuator having a part acting on said first cam member, said part being movable between a first position in which it engages said friction surface and is operable to move said friction surface out of engagement with said friction element and a second position in which said surface and said element are permitted to engage, a spring urging said part toward said first position and into engagement with said friction surface while said first cam member turns relative to said part, means responsive to the relative turning between said part and said first cam member to progressively increase the engagement between said part and said friction surface and move said part to said first position thereby to disengage said friction surface and said friction element and brake said first cam member, and a manual member selectively operable to move said part toward said second position against the action of said spring thereby to couple said implement and said shaft.

2. An assembly as defined in claim 1 in which said cam members include opposed generally axial surfaces which engage when said part engages said friction surface whereby said part brakes said first cam member and said axial surfaces engage to stop said second cam member and said rotary implement.

3. In an assembly for driving a rotary implement carried and driven by a power rotated shaft, the combination of, an annular friction element adapted to be fixed to said shaft to rotate therewith, a first annular cam member coaxial with and rotatable relative to said shaft, said cam member having a friction surface opposing said friction element and axially movable to bring the friction surface into engagement with the friction element whereby said cam member rotates with said shaft, a second cam member mounted to rotate relative to said shaft and adapted to carry a rotary implement, means holding said second cam member against axial movement relative to said shaft, opposed inclined cam surfaces formed on said first and second cam members and normally engaging each other when said first cam member is rotating whereby the two cam members rotate together, resilient means acting on said first cam member and urging the latter axially of said shaft in a direction to engage said friction element, an actuator having a part acting on said first cam member, said part being movable between a first position in which it engages said friction surface and is operable to move said friction surface out of engagement with said friction element and a second position in which said surface and said element are permitted to engage, a spring urging said part toward said first position and into engagement with said friction surface while said first cam member turns relative to said part, means responsive to the relative turning between said part and said first cam member to progressively increase the engagement between said part and said friction surface and move said part to said first position thereby to disengage said friction surface and said friction element and brake said first cam member, and a manual member selectively operable to move said part toward said second position against the action of said spring thereby to couple said implement and said shaft, and opposed generally axially extending surfaces formed on said cam members and operable to engage each other upon friction braking of said first cam member to stop rotation of said second cam member.

4. In an assembly as defined by claim 3, at least one abutment formed on one of said cam members and circumferentially spaced from the corresponding inclined surface, and a recess formed in the other of said cam members and positioned to receive said abutment when said generally axial surfaces are in engagement thereby to hold the latter surfaces in engagement when said cam members are stopped.

5. In an assembly for driving a rotary implement adapted to be carried by a frame and driven by a power-rotated shaft, the combination of, a member mounted for rotation relative to said shaft and adapted to carry said rotary implement, a clutch having first and second elements, one of said elements being coupled to said shaft and said other element being coupled to said member, said first element being axially movable toward and away from said second element to engage and disengage said clutch, a spring urging said first element toward said second element thereby normally to engage said clutch, an actuator including first and second rings rotatable in first and second directions relative to each other, said first ring also being axially movable away from said second ring, said rings having opposed and coacting inclined surfaces operable when the rings rotate relatively in said first direction to move said first ring axially away from said second ring and into frictional engagement with said first element, yieldable means normally urging said rings in said first direction to move said first ring into engagement with said first element whereby said first ring begins turning with said first element, said inclined surfaces being responsive to turning of said first ring to turn said rings further in said first direction thereby to disengage said clutch, and a manually operable member connected to one of said rings and operable to move said rings relatively in said second direction against the action of said yieldable means and thereby permit said clutch to be engaged.

6. The combination as defined by claim 5 in which said inclined surfaces engage each other.

7. The combination as defined by claim 5 including a ball disposed between said inclined surfaces whereby said ball rolls on said surfaces when said rings move relatively in said first direction and said first ring is moved axially away from said second ring.

8. A clutch-brake assembly for a rotary implement carried by a frame and driven by a power rotated shaft, said assembly comprising, an annular friction element coaxial with and fixed to said shaft to rotate therewith, said element having a first annular friction surface facing axially of said shaft, a first annular cam member coaxial with and rotatable relative to said shaft, said first annular cam member having a second annular friction surface facing axially of said shaft and opposing said first friction surface, a second annular cam member mounted coaxially with said shaft to rotate relative thereto and adapted to carry a rotary implement, said first cam element being mounted to move axially of said shaft to move said friction surfaces into and out of engagement with each other, opposed inclined cam surfaces formed on said first and second cam members and normally engaging each other when said first cam member is rotating whereby the two cam members rotate together and said inclined surfaces produce a self-energizing effect to move said first cam member axially in direction to engage said friction surfaces into engagement to cause said cam members, said element and said implement to rotate together, an annular spring disposed between said cam members and urging said second friction surface into engagement with said first friction surface, generally axial and opposed surfaces formed on said cam members and engageable when the rotation of said first cam member is retarded to stop rotation of said second cam member and said implement, a first annular ring coaxial with said shaft and having an axial friction face engageable with said second annular friction surface, a second annular ring coaxial with said shaft and adapted to be fixed to said frame, said rings having axially inclined surfaces normally engageable with each other and operable to produce a self-energizing effect to cause said friction face to engage said second annular friction surface and move said first cam member away from said element thereby to disengage said friction surfaces and to engage said generally axial surfaces to stop rotation of said second cam member and said implement, a spring acting between said frame and said first ring to rotate said first ring in a direction to effect axial displacement of said rings in a direction thereby to move said friction surfaces away from each other whereby said implement is disengaged from said shaft and said generally axial surfaces brake said implement, and a manually actuated part connected to said first ring and operable when actuated to turn said first ring against the action of said spring to effect axial displacement of said rings in a direction to disengage said friction face and second friction surface and to engage said two friction surfaces whereby said shaft is frictionally coupled to said implement.

9. A clutch-brake assembly for a rotary implement carried by a frame and driven by a power rotated shaft, said assembly comprising, an annular friction element coaxial with and fixed to said shaft to rotate therewith, said element having a first annular friction surface facing axially of said shaft, a first annular cam member coaxial with and rotatable relative to said shaft, said first annular cam member having a second annular friction surface facing axially of said shaft and opposing said first friction surface, a second annular cam member mounted coaxially with said shaft to rotate relative thereto and adapted to carry a rotary implement, said first cam element being mounted to move axially of said shaft to move said friction surfaces into and out of engagement with each other, opposed inclined cam surfaces formed on said first and second cam members and normally engaging each other when said first cam member is rotating whereby the two cam members rotate together and said inclined surfaces produce a self-energizing effect to move said first cam member axially in a direction to engage said friction surfaces into engagement to cause said cam members, said element and said implement to rotate together, an annular spring disposed between said cam members and urging said second friction surface into engagement with said first friction surface, generally axial and opposed surfaces formed on said cam members and engageable when the rotation of said first cam member is retarded to stop rotation of said second cam member and said implement, a first annular ring coaxial with said shaft and having an axial friction face engageable with said second annular friction surface, a second annular ring coaxial with said shaft and adapted to be fixed to said frame, said rings having axially inclined surfaces coacting with each other to produce a self-energizing effect to cause said friction face to engage said second annular friction surface and move said first cam member away from said element thereby to disengage said friction surfaces and to engage said generally axial surfaces to stop rotation of said second cam member and said implement, yieldable means urging said first ring to rotate in a direction to effect axial displacement of said rings in a direction thereby to move said friction surfaces away from each other whereby said implement is disengaged from said shaft and said generally axial surfaces brake said implement, and a manually actuated part connected to said first ring and operable when actuated to turn said first ring against the action of said spring to effect axial displacement of said rings in a direction to disengage said friction face and second friction surface and to engage said two friction surfaces whereby said shaft is frictionally coupled to said implement.

10. The combination as defined by claim 9 in which said inclined surfaces on said rings engage each other.

11. The combination as defined by claim 10 including a ball disposed between said inclined surfaces on said rings whereby said ball rolls on said surfaces when said first ring is turned and said rings are moved axially relative to each other.

12. In an assembly for driving a rotary implement by a power-rotated shaft, the combination of, a first clutch member adapted to be connected to said shaft for rotation therewith, a second clutch member adapted to be connected to said implement for rotation therewith, first and second friction surfaces formed respectively on said first and second clutch members and opposing each other for frictional engagement, means supporting one of said clutch members for movement axially of said shaft toward and away from the other of said clutch members thereby to move said friction surfaces into and out of engagement with each other, initiating means normally operable to move said one member toward said other member to cause said surfaces to engage whereby said first member turns said second member while said two members turn relative to each other, means responsive to the relative rotation of said members and operable to progressively increase the engagement of said surfaces until said members turn together, an actuator comprising a part axially movable relative to said shaft, a surface on said part and frictionally engageable with said one member in a direction to move said one member away from said other member, resilient means acting on said part and operable to urge the surface on said part into engagement with said one member while said part and said one member turn relative to each other, means responsive to relative rotation of said part and said one member and operable to progressively increase the engagement between the surface on said part and said one member thereby to move said one member away from said other member and disengage said friction surfaces, and manual means operable when actuated to act against said resilient means and move said part and the surface thereon out of engagement with said one member whereby said friction surfaces engage and turn said implement with said shaft.

13. The combination as defined in claim 12 in which said one clutch member is said second clutch member and the surface on said part is additionally operable to brake said implement.

14. In an assembly for driving a rotary implement by a power-rotated shaft, the combination of, a first clutch member adapted to be connected to said shaft for rotation therewith, a second clutch member adapted to be connected to said implement for rotation therewith, first and second friction surfaces formed respectively on said first and second clutch members and opposing each other for frictional engagement, means supporting said second clutch member for movement axially of said shaft toward and away from said first clutch member thereby to move said friction surfaces into and out of engagement with each other, initiating means normally operable to move said second member toward said first member to cause said surfaces to engage whereby said first member turns said second member while said two members turn relative to each other, means responsive to the relative rotation of said members and operable to progressively increase the engagement of said surfaces until said members turn together, an actuator comprising a part axially movable relative to said shaft, a surface on said part and frictionally engageable with the friction surface on said second member in a direction to move said second member away from said first member, resilient means acting on said part and operable to urge the surface on said part into engagement with the friction surface on said second member while said part and said second member turn relative to each other, means responsive to relative rotation of said part and said second member and operable to progressively increase the engagement between the surface on said part and the friction surface on said second member thereby to move said second member away from said other member and disengage said friction surfaces, engagement of the surface on said part and the friction surface on said second member being operable to brake said implement, and manual means operable when actuated to act against said resilient means and move said part and the surface thereon out of engagement with the friction surface on said second member whereby said friction surfaces engage and turn said implement with said shaft.

* * * * *